United States Patent [19]

Korshak et al.

[11] 4,116,940
[45] Sep. 26, 1978

[54] POLY/ARYLATE-SULPHONES/AND METHOD OF PREPARING SAME

[76] Inventors: Vasily Vladimirovich Korshak, ulitsa Gubkina, 4, kv. 81; Svetlana Vasilievna Vinogradova, ulitsa Miklukho-Maklaya, 30, korpus 2, kv. 63; Ivan Pavlovich Storozhuk, 1 Baltiisky pereulok, 6/21, korpus 7, kv. 24; Petr Maximilianovich Valetsky, Leningradskoe shosse, 48, kv. 132, all of Moscow; Lev Borisovich Sokolov, ulitsa Truda, 18, kv. 35, Vladimir; Abdulakh Kazbulatovich Mikitaev, ulitsa Profsojuznaya, 214, kv. 6, Nalchik; Andrei Alexandrovich Askadsky, ulitsa Profsojuznaya, 102, korpus 6, kv. 25, Moscow; Jury Sergeevich Kochergin, ulitsa D.Ulyanova, 5, kv. 10, Moscow; Grigory Lvovich Slonimsky, ulitsa Chkalova, 1, kv. 16, Moscow; Larisa Borisovna Shirokova, ulitsa Sovetskoi Armii, 3, kv. 45, Moscow; Ljudmila Fedorovna Nebosenko, ulitsa Tokareva, 8, kv. 26; Nikolai Danilovich Zhuravlev, ulitsa Belokonskoi, 15b, kv. 44, both of Vladimir, all of U.S.S.R.

[21] Appl. No.: 737,994

[22] Filed: Nov. 2, 1976

[30] Foreign Application Priority Data

Nov. 17, 1975 [SU] U.S.S.R. .............................. 2187066

[51] Int. Cl.² ...................... C08G 63/18; C08G 63/66; C08G 63/68
[52] U.S. Cl. .................................. 528/173; 528/128; 528/174
[58] Field of Search ..................................... 260/49, 61

[56] References Cited

U.S. PATENT DOCUMENTS 3,663,509   5/1972   Bonnard et al. ........................ 260/49
3,729,447   4/1973   Haberland et al. ............. 260/47 XA Primary Examiner—Lester L. Lee
Attorney, Agent, or Firm—Lackenbach, Lilling & Siegel

[57] ABSTRACT

The present invention relates to novel compounds, viz. poly(arylate-sulphones) and to a method of preparing same. The compounds according to the present invention have the following formula:

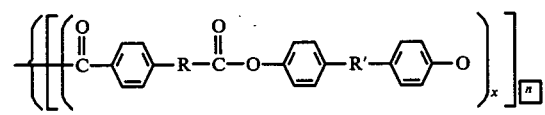

-continued

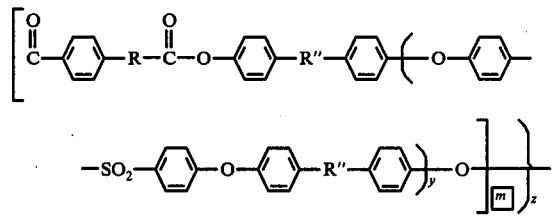

wherein
R is a carbon-to-carbon bond in para- or meta-position;

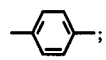

;

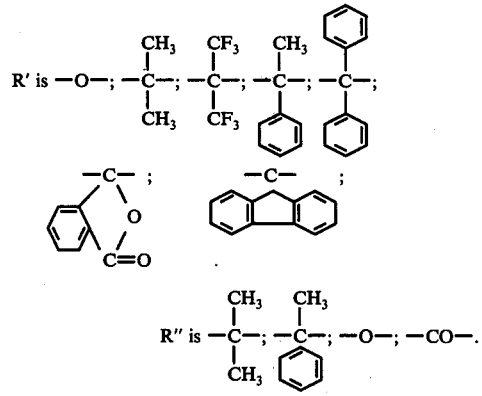

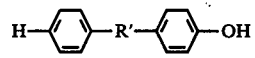

$n$, $m$ are indices denoting statistical distribution of structures over the macrochain; $n$ and $m$ are statistical values ranging from 1 to 10; $x$ is a statistical value ranging from 1 to 100; $y = 3$ to 20; $z = 5$ to 20.

The method of preparing said poly-(arylate-sulphones) comprises polycondensation of dichloroanhydrides of dicarboxylic acids with a mixture of bisphenol of the formula:

H—⟨◯⟩—R'—⟨◯⟩—OH

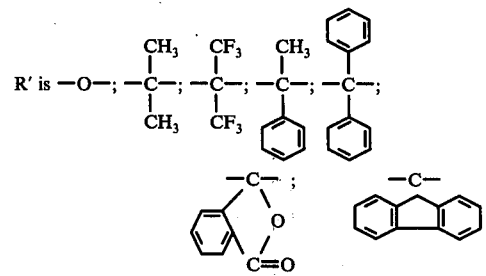

and an oligosulphone of the formula:

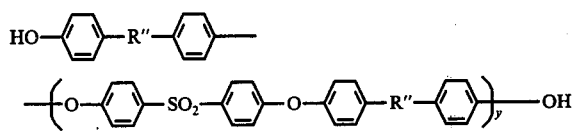

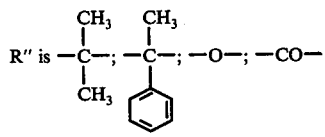

wherein $y = 3$ to 20;

R" is $-\underset{\underset{CH_3}{|}}{\overset{\overset{CH_3}{|}}{C}}-$; $-\underset{\underset{C_6H_5}{|}}{\overset{\overset{CH_3}{|}}{C}}-$; $-O-$; $-CO-$ said oligosulphone being contained in the mixture in an amount ranging from 3 to 97% by weight as calculated for the desired poly(arylate-sulphone). The reaction is conducted in a medium of chlorinated hydrocarbons, followed by isolation of the desired product. The poly(arylate-sulphones) according to the present invention have a melt viscosity within the range of from $10^{3.8}$ to $10^{5.0}$ poises at a temperature of 330° C and a shear stress of $10^6$ dn/cm², which substantially facilitates their processing into articles by injection-molding or extrusion; they also feature a high heat-resistance as well as high thermal and mechanical characteristics. The method according to the present invention makes it possible to prepare poly(arylate-sulphones) on existing commercial plants producing polyarylates without any changes in the process scheme.

12 Claims, No Drawings

POLY/ARYLATE-SULPHONES/AND METHOD OF PREPARING SAME

The present invention relates to novel compounds, viz. poly(arylate-sulphones) and to a method of preparing same.

The poly(arylate-sulphones) according to the present invention are useful as construction and electroinsulating materials.

The poly(arylate-sulphones) according to the present invention correspond to the following generic formula:

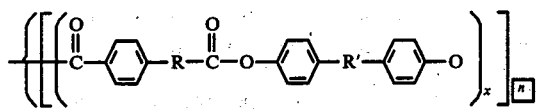

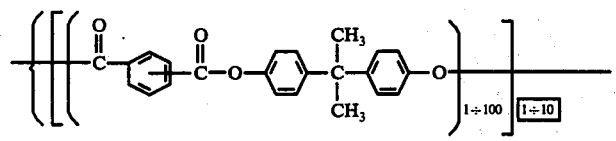

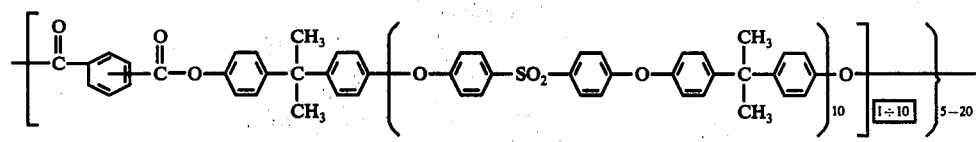

para-: meta- = 1:1

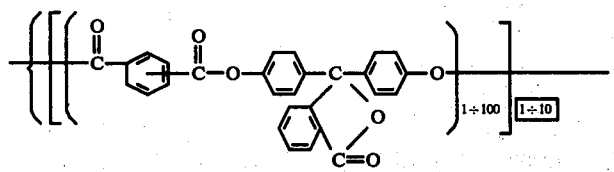

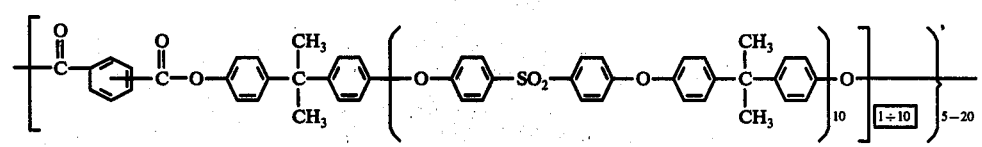

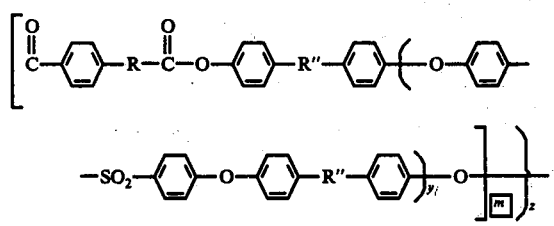

wherein
R is carbon-to-carbon bond in para- or meta- position;

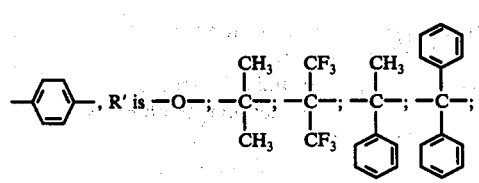

-continued

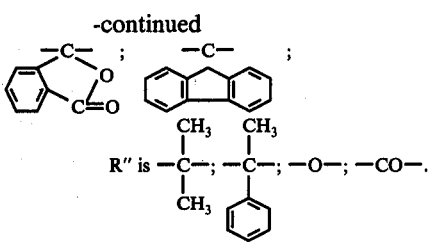

$n, m$ are indices denoting statistical distribution of structures over the macrochain;
$n$ and $m$ are statistical values ranging from 1 to 10;
$x$ is a statistical value ranging from 1 to 100;
$y = 3$ to $20$; $z = 5$ to $20$.

The poly(acrylate-sulphones) mentioned hereinafter are most preferable, as to the combination of their physico-mechanical and rheological properties, and most important for practical implementation:

Investigations of the physico-chemical properties thereof have given the following results.

Poly(arylate-sulphones) are white, powder-like floccular compounds soluble in chloroform, methylene chloride, tetrachloroethane, cyclohexanone. Films cast from solutions of poly(arylate-sulphones) in said solvents are colorless and transparent. Articles molded of poly(arylate-sulphones) are also transparent but have a light yellow color.

The method of preparing poly(arylate-sulphones) according to the present invention comprises polycondensation of dichloroanhydrides of dicarboxylic acids with a mixture of a bisphenol of the formula:

$$HO-\phi-R'-\phi-OH \quad (4)$$

wherein

-continued

R' is 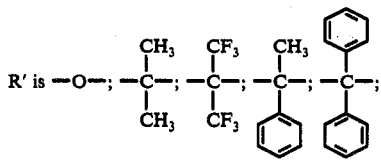

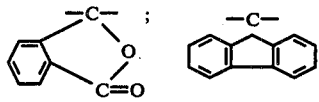

and an oligosulphone of the formula:

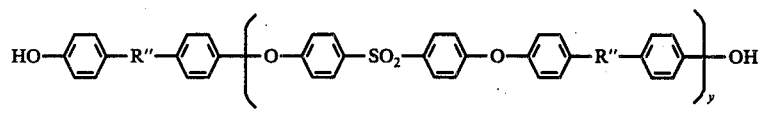

wherein $y = 3$ to 20;

R'' is 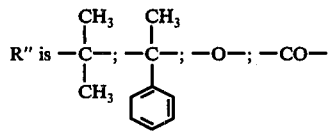

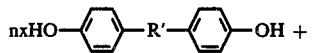 OH +

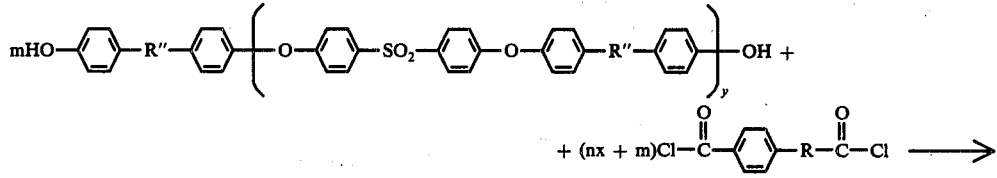

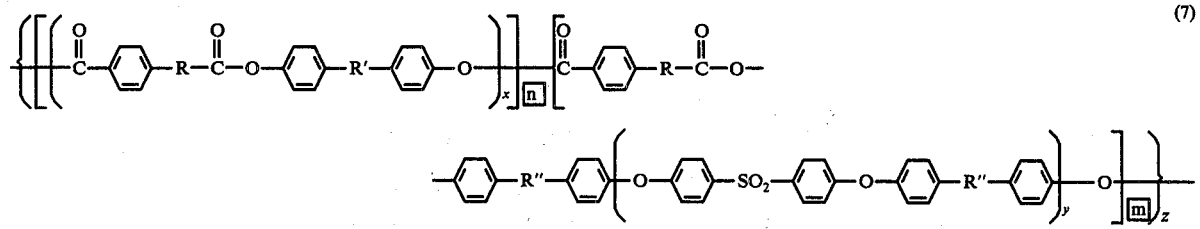

said oligosulphone being contained in the mixture in an amount ranging from 3 to 97% by weight as calculated for the desired poly(arylate-sulphone) in a medium of chlorinated hydrocarbons, followed by isolation of the resired product.

In the case of acceptor-catalytical polycondensation the reaction should be conducted in a medium of chlorinated aliphatic hydrocarbons in the presence of triethylamine taken in an amount which should be equimolar in respect of the dicarboxylic acid dichloroanhydride at a temperature within the range of from 15° to 25° C.

In the case of high-temperature polycondensation, the reaction should be conducted in a medium of chlorinated diphenyl at a temperature within the range of from 210° to 230° C.

The most preferable, according to the present invention, are mixtures of 4,4'-dihydroxydiphenyl-2,2-propane or phenolphthalein with an oligosulphone of the formula:

(6)

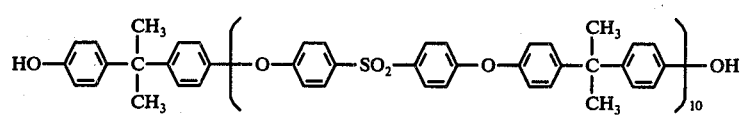

said oligosulphone being contained in the mixture in an amount ranging from 5 to 15% by weight as calculated for the desired poly(acrylate-sulphone).

The method of preparing poly(acrylate-sulphones) according to the present invention is preferably embodied in the following manner.

The poly(acrylate-sulphones) corresponding to the above-given generic formula are prepared by reacting dichloroanhydrides of dicarboxylic acids with a mixture of bisphenols with oligosulphones containing terminal hydroxyl groups under the conditions of acceptor-catalytical or high-temperature polycondensation according to the following scheme:

(7)

wherein
 $n, m$ are indices denoting statistical distribution of structure over the macrochain;
 $n$ and $m$ are statistical values ranging from 1 to 10;
 $x$ is a statistical value ranging from 1 to 100;
 $y = 3$ to 20; $z = 5$ to 20.

The thus-prepared poly(arylate-sulphones) comprise statistical block-copolymers.

In the case of acceptor-catalytical polycondensation, the reaction is conducted in a medium of chlorinated aliphatic hydrocarbons such as anhydrous 1,2-dichloroethane, chloroform, methylene chloride at room temperature in the presence of triethylamine which acts as an acceptor-catalyst of the reaction. Triethylamine is employed in an amount which is equimolar in respect to the dicarboxylic acid dichloroanhydride.

The high-temperature polycondensation is conducted in a medium of chlorinated diphenyl at a temperature within the range of from 210° to 230° C.

In the synthesis of statistical (random) poly(arylate-sulphones) use is made of a mixture of compounds with reactive phenolic hydroxy groups which mixture consists of a bisphenol such as diphenylolpropane, phenolphthalein, 9,9-bis(4-hydroxyphenyl)fluorine and an oligosulphone of formula (5); this mixture is then subjected to interaction with dichloroanhydrides of aromatic dicarboxylic acids. Total ratio between hydroxyl and chloroanhydride groups in the reaction mixture is 1:1 (molar ratio) and the oligosulphone content ranges from 3 to 97% by weight as calculated for the desired product.

The starting oligosulphones with terminal hydroxyl groups are preliminarily prepared from disodium or dipotassium salts of bisphenols of the following structural formula:

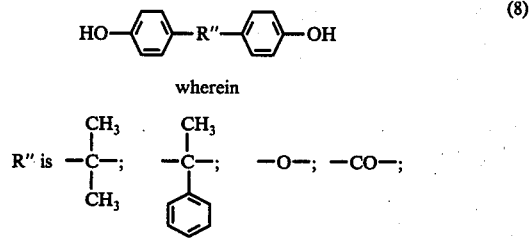

(8)

wherein

R" is —C(CH$_3$)(CH$_3$)—; —C(CH$_3$)(C$_6$H$_5$)—; —O—; —CO—;

and 4,4'-dichlorodiphenylsulphone in a medium of dimethylsulphoxide.

Polymerization degree of these oligomers ($y = 3$ to 20) is predetermined by adjusting proportions of the starting compounds.

The structure of the poly(arylate-sulphones) according to the present invention is proven by elemental analysis and IR-spectroscopy data.

In IR-spectra of poly(arylate-sulphones) there are observed characteristic bands of valent variations for the sulphonyl group within the range of 550; 570; 1,115; 1,160; 1,180; 1,300; and 1,330 cm$^{-1}$; for the methyl group in the residue of diphenylolpropane — within the range of 1,370; 1,390; 1,415; 2,880 and 2,980 cm$^{-1}$; for the ester group in the residues of dichloroanhydrides of dicarboxylic acids — within the range of 1,745 cm$^{-1}$; for the ester group in the phenolphthalein residues — within the range of 1,780 cm$^{-1}$.

Known in the art are polyarylates of different structure including hard polyarylates which are employed as construction materials and possess high-glass-transition temperatures and a high heat-resistance (up to 250° – 280° C) which is due mainly to a strong interchain action caused by polar carbonyl groups of the ester bond (cf. Askadsky A. A., "Physico-chemistry of Polyarylates," Moscow, "Khimija" Publishing House, 1968). Meanwhile, polyarylates feature a high melt viscosity (up to $10^7 - 10^9$ poises) even at temperatures above 300° C, whereby molding of shaped articles by injection-molding or extrusion is substantially hindered. In these cases, it is necessary to heat the melt of a polyarylate to a temperature within the range of from 400° to 450° C which results in chemical and mechanochemical destruction of polymers and impaired mechanical strength and thermostability thereof. All this complicates, or even does not make it possible to perform, processing of polyarylates on conventional equipment adapted for injection-molding and extrusion.

Also known in the art are aromatic polyethers such as polyarylenesulphides (referred to as polysulphones) which, compared to polyarylates, have a low melt viscosity ($10^4$ to $10^5$ poises) and are readily processed by injection molding or extrusion (cf. Mills N.J., Nevin A, McAinsh J. "J. Macromol. Sci.", 1970, B4, No. 4, 863 – 876). Polysulphones have a high thermal stability (up to 450° – 500° C) but feature a low heat-resistance (up to 200° C) as the main disadvantage thereof.

Statistical poly(arylate-sulphones) prepared from polyarylate, polysulphone block elements and a dicarboxylic acid dichloroanhydride as a chain-propagation agent as well as regular alternation poly(arylate-sulphones) formed from preliminarily prepared polyarylate macrodichloroanhydrides (in situ) and oligosulphones feature high melt viscosities: $10^{6.7} - 10^{7.6}$ poises and $10^{5.6} - 10^{6.0}$ poises at the temperature of 330° C and shear stress of $10^6$ dn/cm$^2$ respectively even at an oligosulphone content as high as 60% by weight as calculated for the desired product. Furthermore, the synthesis of statistical poly(arylate-sulphones) from two block elements requires preliminary preparation and isolation of an oligoarylate with terminal hydroxyl groups, while preparation of a macrodichloroanhydride required for the formation of regular altern poly(arylate-sulphones) necessitates special care during the experiment. All this does not make it possible to recommend such block-copolymers for commercial application.

The poly(arylate-sulphones) according to the present invention, depending on their composition, feature inadditive variation of viscosity in the melts thereof.

Moreover, an unobvious and very important fact resides in a considerably reduced melt viscosity at a low content of the oligosulphonic component (5 to 15% by weight). The poly(arylate-sulphones) having such composition feature a melt viscosity within the range of from $10^{3.8}$ to $10^{5.0}$ poises at a temperature of 330° C and a shear stress of $10^6$ dn/cm$^2$; this melt viscosity is not only substantially lower than the melt viscosity of corresponding polyarylates ($10^{6.8}$ to $10^{7.2}$ poises) but even lower than the melt viscosity of polysulphones (e.g. in the case if the polysulphone based on diphenylolpropane and 4,4'-dichlorodiphenylsulphone it is equal to $10^{4.4}$ poises). With regard to polyarylates, the low viscosity of poly(arylate-sulphones) of the above-mentioned composition facilitates processing thereof into articles by injection-molding or extrusion using conventional equipment.

On the other hand, incorporation of the oligosulphone component into macrochains of polyarylates makes it possible to enhance other process characteristics thereof (cf. the Table hereinbelow). Thus, poly(arylate-sulphones) have a higher thermostability (by 50° C as high on the average judging on a 10% mass loss) as compared to corresponding polyarylates. Poly(arylate-sulphones) have substantially higher relative elongation at rupture: 70 to 130% compared to 5 to 20% for polyarylates. At the same time, poly(arylate-sulphones) have a tensile strength amounting to 700 – 800 kg/cm$^2$ which is comparable to best ratings for polysulphones and polyarylates (700 to 800 kg/cm$^2$). Heat-resistance (softening temperatures taken from thermomechanical curves for powder-like and film-like samples) of poly-(arylate-sulphones) containing 5 to 15% by weight of oligosulphones is equal to heat-resistance of corresponding polyarylates.

-continued

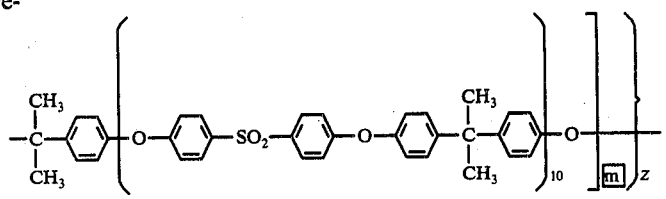

Table

| Polymer a) | Oligosulphone content b) | $\eta$reduced at 25° C, dl/g c) | $\eta$appar. poises d) | Soften. point of table, °C e) | Soften. point of film, °C f) | T, °C 10% g) | Tensile strength, kg/cm² | Relative elongation, % | Young modulus, kg/cm² |
|---|---|---|---|---|---|---|---|---|---|
| Polysulphone | 100 | 0.65 | $10^{4.4}$ | 195 | 190 | 510 | 700 | 80 | $2.5 \times 10^4$ |
| Polyarylate A | 0 | 0.75 | $10^{7.2}$ | 270 | 260 | 410 | 600 | 7 | $1.6 \times 10^4$ |
| Polyarylate B | 0 | 0.92 | $10^{6.8}$ | 220 | 210 | 390 | 600 | 8 | $1.2 \times 10^4$ |
| Poly(arylate-sulphones): | | | | | | | | | |
| Series C | | | | | | | | | |
| 1 | 50 | 0.74 | $10^{2.6}$ | 230 | 160 | 450 | 650 | 90 | $1.5 \times 10^4$ |
| 2 | 25 | 1.20 | $10^{5.3}$ | 250 | 210 | — | 700 | 85 | $1.2 \times 10^4$ |
| 3 | 10 | 0.86 | $10^{3.8}$ | 270 | 250 | 460 | 700 | 80 | $1.3 \times 10^4$ |
| 4 | 5 | 1.55 | $10^{5.1}$ | 280 | 260 | 465 | 700 | 90 | $1.75 \times 10^4$ |
| 5 | 3 | 1.20 | $10^{7.3}$ | 285 | 260 | 470 | 700 | 65 | $2.0 \times 10^4$ |
| Series D | | | | | | | | | |
| 1 | 50 | 1.31 | $10^{5.2}$ | 207 | 170 | 460 | 750 | 160 | $1.9 \times 10^4$ |
| 2 | 25 | 1.64 | $10^{6.8}$ | 210 | 180 | — | 700 | 120 | $1.6 \times 10^4$ |
| 3 | 10 | 2.26 | $10^{4.8}$ | 211 | 190 | 460 | 800 | 130 | $1.35 \times 10^4$ |
| 4 | 5 | 3.66 | $10^{8.1}$ | 212 | 195 | — | 850 | 115 | $1.35 \times 10^4$ |
| 5 | 3 | 4.34 | $10^{8.2}$ | 212 | 195 | 465 | 800 | 120 | $1.3 \times 10^4$ |

Poly(arylate-sulphone)
Series D
para-:meta- = 1:1

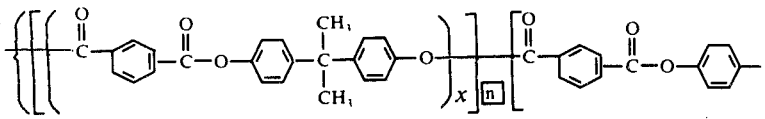

a/Polysulphone

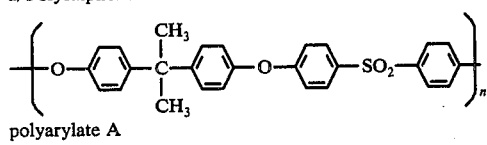

polyarylate A

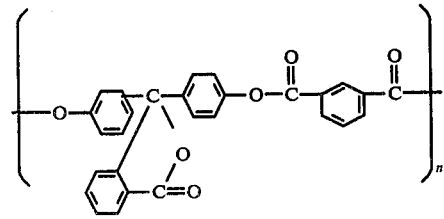

polyarylate B
para-:meta=1:1

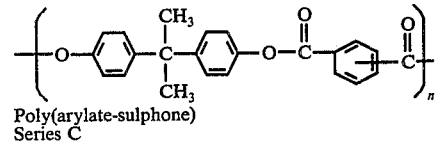

Poly(arylate-sulphone)
Series C

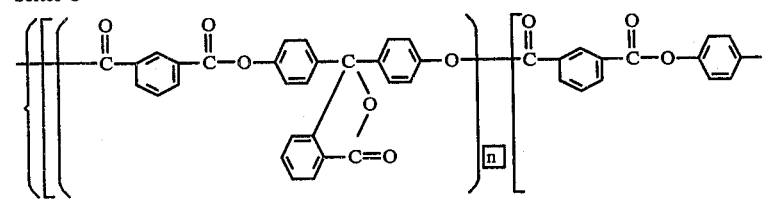

b/ oligosulphone content in the poly(arylate-sulphone), wt.%;
c/ reduced viscosity of a 0.5% polymer solution in tetrachloroethane at the temperature of 25°C;
d/ apparent viscosity of polymer melts is measured in a capillary viscosimeter at the temperatue of 330°C and shear stress of $10^6$ dn/cm²;
e/ thermomechanical softening points for powder-like and film-like polymer samples are determined for the load of 10 and 100 kg/cm² respectively;
f/ the temperature at which the polymer heated in an inert medium (argon) looses 10% of its mass; heating rate is 10°C/min.

Utility of the poly(arylate-sulphones) and of the method of preparing same according to the present invention resides in the following: 1. introduction, into macrochains of hard-to-process polyarylates, of oligosulphone fragments makes it possible to prepare copolymers with the melt viscosity lowered by 2 - 3 orders as compared to corresponding polyarylates, whereby processing thereof into articles by extrusion or injection-molding becomes substantially facilitated; 2. the thus-prepared poly(arylate-sulphones) feature a high heat-resistance equal to that of corresponding polyarylates and high thermal and mechanical properties; 3. the method according to the present invention makes it possible to prepare poly(arylate-sulphones) using conventional process equipment employed in the preparation of poly-arylates without any alterations in the process scheme; 4. owing to their good processability and high operation characteristics, the poly(arylate-sulphones) according to the present invention can be used on a wider commercial scale, as compared to polyarylates, as construction and electroinsulating materials.

For better understanding of the present invention some specific examples illustrating preparation of the poly(arylate-sulphones) according to the invention are given hereinbelow.

EXAMPLE 1

Into a 500 ml three-neck flask provided with a dropping funnel, Dean-Stark trap and a stirrer 57 g (0.25M) of 4,4'-dihydroxydiphenyl-2,2-propane, 220 ml of dimethylsulphoxide and 100 ml of benzene are charged. At the temperature of 90° C the solution is added with 27.2 ml of a 18.35N solution of sodium hydroxide (0.50M), whereafter temperature is elevated to 140° C and the azeotropic mixture benzene-water is distilled-off. After the removal of water, a solution of 64.2 g (0.227M) of 4,4'-dichlorodiphenylsulphone in 100 ml of benzene is dropwise added at the temperature of 140° C for 10 minutes. Then, benzene is distilled off and the reaction is conducted for additional 5 hours. Afterwards, the reaction mass is poured into acidified water, the resulting precipitate is filtered-off and washed with water to completely remove chlorine ions.

The yield of the resulting oligosulphone with terminal hydroxyl groups is 105 g or 99% by weight of the theoretical. Molecular weight as determined ebuliometrically is 4,600 which corresponds to $y = 10$. Softening point in a capillary is 177° – 183° C. Softening temperature from the thermomechanical curve is 178° C.

Found, %: C, 72.79; 72.45; H, 5.10; 5.08; S 6.95; 6.81. Calculated for $C_{285}H_{236}S_{10}O_{42}$, %: C, 73.55; H, 5.12; S 6.89.

Into a 750 ml two-neck flask provided with a mechanical stirrer 20 g (0.0627M) of phenolphthalein, 29.214 g (0.00635M) of an oligosulphone based on diphenylolpropane and 4,4'-dichlorodiphenylsulphone with $y = 10$ which constitutes 50% by weight of the polymer, 400 ml of 1,2-dichloroethane and 19.16 ml (0.138M) of triethylamine are charged. 5 minutes after, 14.031 g (0.0692M) of isophthalic acid dichloroanhydride are added into the falsk at the temperature of 20° C. The reaction is conducted for 3 hours, the reaction mass is diluted with chloroform to 1,500 ml and the polymer is precipitated in methanol. The resulting precipitate is filtered-off and washed with water till complete removal of chlorine ions.

The yield of polymer I of Series C (see the Table hereinbefore) is 55.5 g of 95% by weight of the theoretical value; reduced viscosity of its solution in tetrachloroethane at the temperature of 20° C is 0.74 dl/g.

EXAMPLE 2

Into a 750 ml two-neck flask provided with a mechanical stirrer there are charged 30 g (0.094M) of phenolphthalein, 4,869 g (0.00106M) of an oligosulphone as prepared in the foregoing Example 1 which is 10% by weight of the polymer, 400 ml of methylene chloride and 26.42 ml (0.19M) of triethylamine. 5 minutes after, 19.346 g (0.09506M) of isophthalic acid dichloroanhydride are introduced into the reaction mixture at the temperature of 20° C. The reaction is then conducted for 3 hours. The yield of polymer 3 of Series C (see the Table hereinbefore) is 46 g or 98% by weight of the theoretical value; reduced viscosity of its solution in tetrachloroethane at the temperature of 25° C is 0.82 dl/g.

EXAMPLE 3

Into a 250 ml three-neck flask provided with a mechanical stirrer, bubbling means for nitrogen and an outlet pipe for gases, 30 g (0.094M) of phenolphthalein, 4.869 g (0.00106M) of an oligosulphone as prepared in the foregoing Example 1 ($y = 10$) which corresponds to 10% by weight of the polymer, 19.346 g (0.09506M) of isophthalic acid dichloroanhydride and 65 ml of chlorinated diphenyl are charged. The reaction mixture is heated to the temperature of 180° C and maintained at this temperature for 2 hours, whereafter polycondensation is effected at the temperature of 200° C for 1 hour and at the temperature of 220° C for 6 hours. After cooling, the reaction mixture is diluted with chloroform to 400 ml and poured into methanol. The precipitated polymer is separated by filtration, washed with methanol and extracted with acetone in a Soxhlet apparatus and dried.

The yield of polymer 3 of Series C (see the Table hereinbefore) is 45.8 g or 98% by weight of the theorectical value; reduced viscosity of its solution in tetrachloroethane at the temperature of 25° C is equal to 0.78 dl/g.

EXAMPLE 4

Into a 750 ml two-neck flask provided with a mechanical stirrer there are charged 30 g (0.131M) of 4,4'-dihydroxydiphenyl-2,2-propane, 6.79 g (0.00148M) of an oligosulphone prepared as in the foregoing Example 1 ($y = 10$) which is 10% by weight of the polymer, 400 ml of 1,2-dichloroethane and 36.83 ml (0.265M) of triethylamine. 5 minutes after, a mixture of 13.488 g (0.0663M) of isophthalic acid dichloroanhydride and 13.488 g (0.0663M) of terephthalic acid dichloroanhydride is added into the reaction mixture. The reaction is conducted for 3 hours, whereafter the reaction mass is diluted with chloroform to 1,800 ml and the polymer is precipitated in methanol. The resulting precipitate is separated by filtration and washed with water till complete elimination of chlorine ions.

The yield of polymer 3 Series D (see the Table hereinbefore) is 52.5 g or 97% of the theoretical value; reduced viscosity of its solution in tetrachloroethane at the temperature of 25° C is 0.95 dl/g.

EXAMPLE 5

To 25.73 g (0.12M) of 4,4'-dihydroxydiphenylketone in 100 ml of dimethylsulphoxide and 50 ml of benzene there are added 12.98 ml of a 18.47N solution of sodium hydroxide (0.24M) and a solution of 25.82 g (0.09M) of 4,4'-dichlorodiphenylsulphone in 45 ml of benzene is dropwise added thereto. The reaction is conducted under the conditions similar to those described in the foregoing Example 1. Molecular weight of the resulting oligosulphone as determined ebuliometrically is equal to 1,650 which corresponds to $y = 3$. The product yield is 44.3 g or 98% by weight of the theoretical value. Into a 150 ml three-neck flask provided with a mechanical stirrer, bubbling means for nitrogen and an outlet pipe for gases there are charged 20.221 g (0.1M) of 4,4'-dihydroxydiphenyloxide, 3.3 g (0.002M) of oligosulphone, 24.36 g (0.102M) of isophthalic acid dichloroanhydride and 70 ml of chlorinated diphenyl. The reaction is conducted under the conditions described in Example 3 hereinabove.

The polymer yield is 38.2 g (97% by weight of the theoretical value); reduced viscosity of its solution in tetrachloroethane at the temperature of 25° C is 0.74 dl/g.

EXAMPLE 6

By the procedure similar to that described in the foregoing Example 1 the following synthesis is performed: to 18 g (0.079M) of 4,4'-dihydroxydiphenyl-2,2-propane in 60 ml of dimethylsulphoxide and 20 ml of benzene there are added 16.3 ml of a 3.65N solution of sodium hydroxide (0.158M) and a solution of 21.56 g (0.075M) of 4,4'-dichlorodiphenylsulphone in 30 ml of benzene is dropwise added thereto. Proportions of the reactants ensure the production of an oligosulphone with the molecular weight of 9,000 which corresponds to $y = 20$.

The oligosulphone yield is 34.9 g or 95% by weight of the theoretical value. Softening temperature in a capillary is 195° to 203° C; softening point as determined from the thermomechanical curve is 187° C.

Found, %: C, 72.04; 72.02; H, 4.95; 4.94; S, 7.07; 7.20. Calculated for $C_{556}H_{456}O_{82}S_{20}$, %: C, 73.55; H, 5.06; S, 7.06.

Into a 150 ml three-neck flask provided with a mechanical stirrer, bubbling means for nitrogen and an outlet pipe for gases there are charged 35.042 g (0.1M) of 9,9-bis-(4-hydroxyphenyl)fluorine, 9.0 g (0.001M) of an oligosulphone, 28.192 g (0.101M) of 4,4'-diphenyldicarboxylic acid dichloroanhydride and 70 ml of chlorinated diphenyl. The reaction is carried out under the conditions described in the foregoing Example 3.

The polymer yield is 62.7 g of 96% by weight of the theoretical value; reduced viscosity of its solution in tetrachloroethane at the temperature of 25° C is equal to 0.98 dl/g.

EXAMPLE 7

Under the conditions similar to those described in Example 1 hereinabove, the following synthesis is performed: to a solution of 25 g (0.124M) of 4,4'-dihydroxydiphenyloxide in 110 ml of dimethylsulphoxide and 50 ml of benzene there are added 13.39 ml of a 18.47N solution of sodium hydroxide (0.248M) and 29.586 g (0.103) of 4,4'-dichlorodiphenylsulphone in 45 ml of benzene are dropwise added thereto. The resulting oligosulphone has the molecular weight of 2,300 which corresponds to $y = 5$; the yield is 46.0 g or 97% by weight of the theoretical value.

Into a 150 ml three-neck flask provided with a stirrer, bubbling means for nitrogen and an outlet pipe for gases there are charged 35.224 g (0.1M) of 4,4'-dihydroxydiphenyldiphenylmethane, 11.5 g (0.05M) of the oligosulphone, 21.318 g (0.105M) of isophthalic acid dichloroanhydride and 70 ml of chlorinated diphenyl. The reaction is conducted under the conditions described in the foregoing Example 3 hereinbefore.

The polymer yield is 58.7 g or 97% by weight of the theoretical value; reduced viscosity of its solution in tetrachloroethane at the temperature of 25° C is equal to 1.6 dl/g.

EXAMPLE 8

Into a 150 ml three-neck flask provided with a mechanical stirrer, bubbling means for nitrogen and an outlet pipe for gases there are charged 33.624 g (0.1M) of 4,4'-dihydroxydiphenyl-2,2-hexafluoropropane, 9.2. g (0.002M) of the oligosulphone as prepared in the foregoing Example 1 with $y = 10$, 28.471 g (0.102M) of 4,4'-diphenyldicarboxylic acid dichloroanhydride and 70 ml of chlorinated diphenyl. The reaction is conducted under the conditions similar to those described in Example 3 hereinbefore.

The polymer yield is 61.5 g or 96% by weight of the theoretical value. Reduced viscosity of the polymer solution in tetrachloroethane at the temperature of 25° C is equal to 0.68 dl/g.

EXAMPLE 9

To 25 g (0.134M) of 4,4'-dihydroxydiphenyl in 120 ml of dimethylsulphoxide and 60 ml of benzene there are added 14.54 ml of a 18.47N solution of sodium hydroxide (0.268M) and a solution of 35.05 g (0.122M) of 4,4'-dichlorodiphenylsulphone in 50 ml of benzene is dropwise added thereto. The reaction is conducted under the conditions similar to those described in Example 1 hereinbefore. The oligosulphone with the molecular weight of 4,300 (which corresponds to $y = 10$) is obtained. The oligosulphone yield is 50 g or 98% by weight of the theoretical value.

Into a 150 ml three-neck flask provided with a mechanical stirrer, bubbling means for nitrogen and an outlet pipe for gases there are charged 29.036 g (0.1M) 4,4'-dihydroxydiphenylmethylphenylmethane, 8.6 g (0.002M) of the oligosulphone, 24.36 g (0.102M) of isophthalic acid dichloroanhydride and 75 ml of chlorinated diphenyl. The reaction is conducted under the conditions similar to those described in the foregoing Example 3.

The polymer yield is 51.8 g or 97% by weight of the theoretical value; reduced viscosity of the polymer solution in tetrachloroethane at the temperature of 25° C is equal to 0.88 dl/g.

What is claimed is:
1. Poly(arylate-sulphones) having the formula:

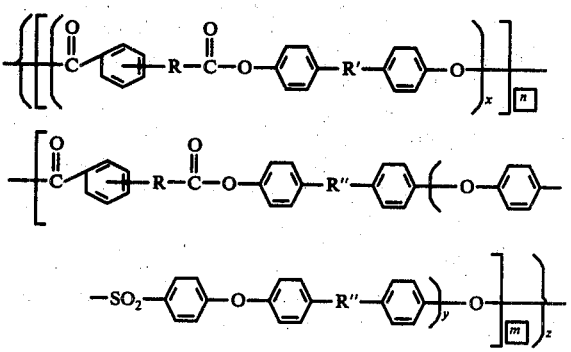

wherein
R is selected from the group consisting of a carbon-carbon bond in para- or meta- position; and

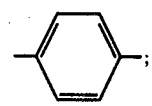

R' is selected from the group consisting of z = 5 to 20.

3. Poly(arylate-sulphones) as claimed in claim 1 having the formula:

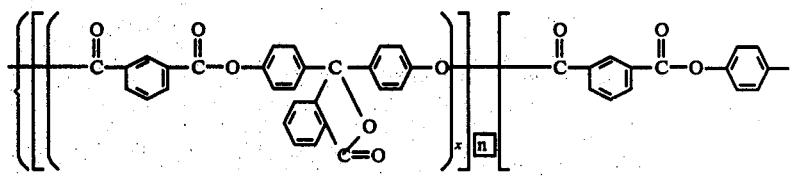

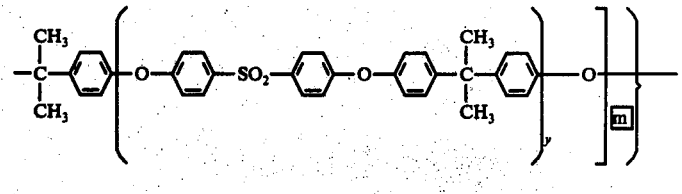

n and m are indices denoting statistical distribution of structures over the macrochain;
n and m are statistical values ranging from 1 to 10;
x is a statistical value ranging from 1 to 100;
y = 10;
z = 5 to 20.

4. A method of preparing poly(arylate-sulphones) of the formula:

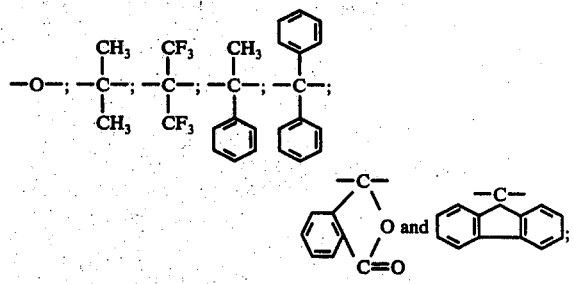

wherein
R is selected from the group consisting of a carbon-carbon bond in para- or meta- position; and

R' is selected from the group consisting of

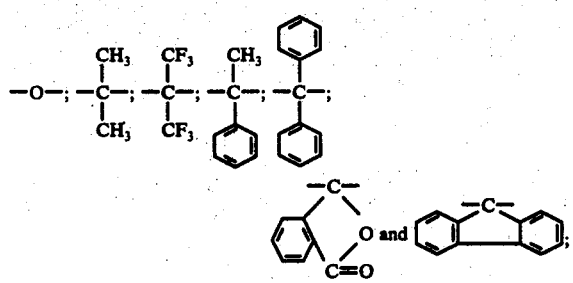

R" is selected from the group consisting of

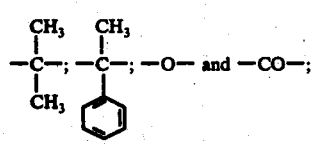

n and m are indices denoting statistical distribution of structures over the macrochain;
n and m are statistical values ranging from 1 to 10;
x is a statistical value ranging from 1 to 100;
y = 3 to 20;
x = 5 to 20.

2. Poly(arylate-sulphones) as claimed in claim 1 having the formula:

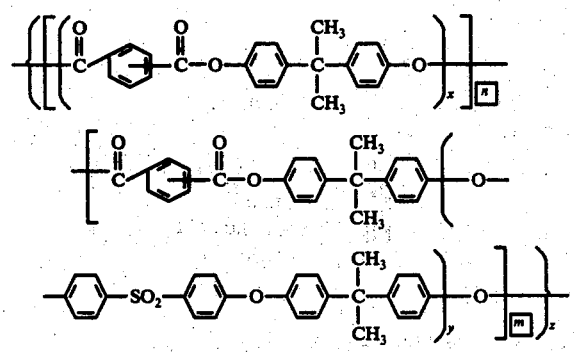

wherein
the ratio of para:meta is 1:1,
n and m are indices denoting statistical distribution of structures over the macrochain;
n and m are statistical values ranging from 1 to 10;
x is a statistical value ranging from 1 to 100;
y = 10;

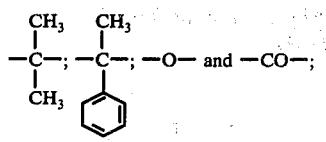

$n$ and $m$ are indices denoting statistical distribution of structures over the macrochain; $n$ and $m$ are statistical values ranging from 1 to 10; $x$ is a statistical value ranging from 1 to 100; $y = 3$ to 20; $z = 5$ to 20;

comprising polycondensation of dichloroanhdrides of dicarboxylic acids with a mixture of a bisphenol of the formula:

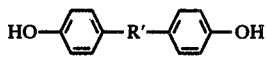

wherein
R' is selected from the group consisting of

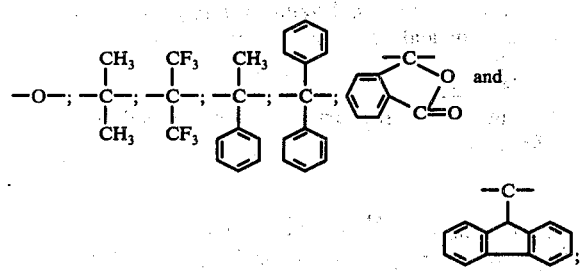

and oligosulphone of the formula:

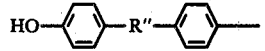

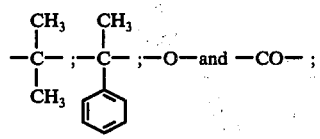

wherein
$y = 3$ to 20;
R'' is selected from the group consisting of said oligosulphone being contained in the mixture in an amount ranging from 3 to 97% by weight; said polycondensation being conducted in a medium of chlorinated hydrocarbon selected from the group consisting of chlorinated diphenyl, 1,2-dichloroethane, and methylene chloride, followed by separation of the product.

5. A method as claimed in claim 4, wherein said polycondensation is conducted in a medium of chlorinated aliphatic hydrocarbons selected from the group consisting of 1,2-dichloroethane and methylene chloride in the presence of triethylamine taken in a equimolar amount with respect to the dicarboxylic acid dichloroanhydride at a temperature ranging from 15° to 25° C.

6. A method as claimed in claim 4, wherein said polycondensation is conducted in a medium of chlorinated diphenyl at a temperature ranging from 210° to 250° C.

7. A method of preparing poly(arylate-sulphones) of the formula:

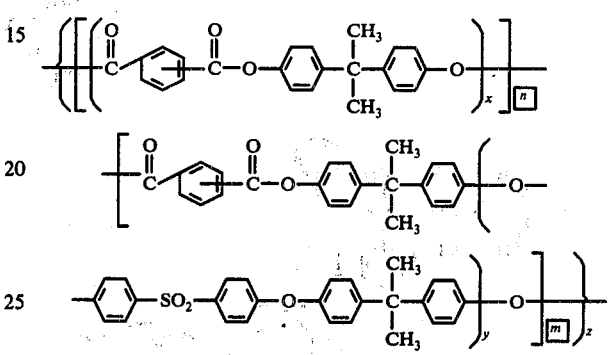

wherein
the ratio of para:meta is 1:1,
$n$ and $m$ are indices denoting statistical distribution of structures over the macrochain;
$n$ and $m$ are statistical values ranging from 1 to 10;
$x$ is a statistical value ranging from 1 to 100;
$y = 3$ to 20;
$z = 5$ to 20;

comprising polycondensation of dichloroanhydrides of dicarboxlyic acids with a mixture of 4,4'-dihydroxydiphenyl-2,2-propane with an oligosulphone of the formula:

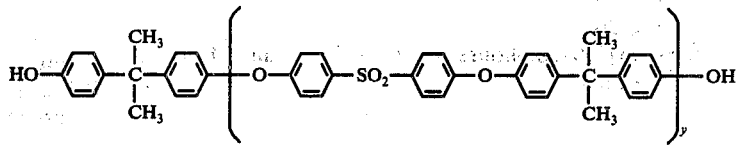

wherein $y = 10$
said oligosulphone being contained in the mixture in an amount ranging from 5 to 15% by weight; said polycondensation being conducted in a medium of chlorinated hydrocarbons selected from the group consisting of chlorinated diphenyl, 1,2-dichloroethane, and methylene chloride, followed by separation of the product.

8. A method as claimed in claim 7, wherein the polycondensation is conducted in a medium of chlorinated aliphatic hydrocarbons selected from the group consisting of 1,2-dichloroethane and methylene chloride in the presence of triethylamine taken in an equimolar amount with respect to the dicarboxylic acid dichloroanhydride at a temperature ranging from 15° to 25° C.

9. A method as claimed in claim 7, wherein the polycondensation is conducted in a medium of chlorinated diphenyl at a temperature ranging from 210° to 230° C.

10. A method of preparing poly(arylate-sulphones) of the formula:

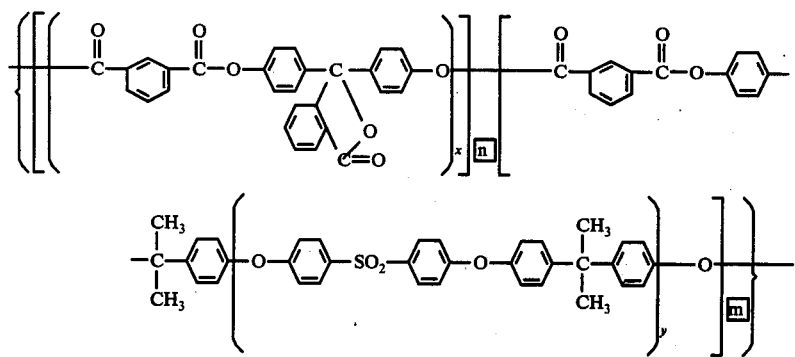

wherein
- $n$ and $m$ are indices denoting statistical distribution of structures over the macrochain;
- $n$ and $m$ are statistical values ranging from 1 to 10;
- $x$ is a statistical value ranging from 1 to 100;
- $y = 10$;
- $z = 5$ to 20;

comprising reacting dichloroanhydrides of dicarboxylic acids with a mixture of phenolphthalein with an oligosulphone of the formula:

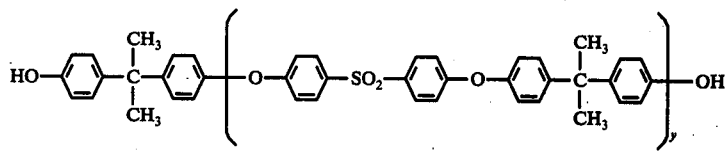

wherein $y = 10$;
said oligosulphone being contained in the mixture in an amount ranging from 5 to 15% by weight; said polycondensation being conducted in a medium of chlorinated hydrocarbons selected from the group consisting of chlorinated diphenyl, 1,2-dichloroethane, and methylene chloride followed by separation of the product.

11. A method as claimed in claim 10, wherein the polycondensation is conducted in a medium of chlorinated aliphatic hydrocarbons selected from the group consisting of 1,2-dichloroethane and methylene chloride in the presence of triethylamine taken in an equimolar amount with respect to the dicarboxylic acid dichloroanhydride at a temperature ranging from 15° to 25° C.

12. A method as claimed in claim 11, wherein the polycondensation is conducted in a medium of chlorinated diphenyl at a temperature ranging from 210° to 230° C.

* * * * *